United States Patent [19]
Warren

[11] 3,789,960
[45] Feb. 5, 1974

[54] ROLLER BRAKE SYSTEM
[75] Inventor: Robert A. Warren, Long Beach, Calif.
[73] Assignee: McDonnell Douglas Corporation, Santa Monica, Calif.
[22] Filed: May 18, 1972
[21] Appl. No.: 254,495

[52] U.S. Cl.................. 188/74, 188/84, 188/110, 193/35 A
[51] Int. Cl............................................. F16d 63/00
[58] Field of Search... 188/74, 80, 83, 84, 166, 195, 188/110; 193/35 A

[56] References Cited
UNITED STATES PATENTS
2,944,636  7/1960  Rockwell ..................... 188/74 X
2,979,177  4/1961  Sullivan ....................... 193/35 A
3,102,298  9/1963  Sheahan ....................... 188/84 X
3,108,671  10/1963  Fuka et al. .................. 193/35 A

*Primary Examiner*—George E. A. Halvosa
*Attorney, Agent, or Firm*—George W. Finch; Walter J. Jason; Donald L. Royer

[57] ABSTRACT

A roller brake system including a plurality of rollers each having an associated friction member which is moved into engagement by controlled pressurized medium applied to a side of the friction member opposite the roller.

3 Claims, 5 Drawing Figures

ROLLER BRAKE SYSTEM

BACKGROUND OF THE INVENTION

It is desirable that passenger and/or cargo aircraft currently being used include on-board powered systems for cargo loading and off-loading. These powered systems, to be economically feasible, must be capable of operation by a minimum number of cargo handling personnel resulting in a reduction of the total number of ramp service personnel required and the shortening of the turnaround time for the aircraft. Most of the presently available on-board loading/unloading systems are comprised of roller conveyors in association with some form of powered cargo moving device. In order to reduce the power requirements of the moving device, the roller conveyor systems use low friction bearings in the rollers. These low friction rollers in addition to reducing the power requirements, enable a single person to load or unload the aircraft manually in case the powered system malfunctions, Unfortunately, these same low friction rollers also allow the pallets or containers usually moved thereacross to roll or coast freely within the aircraft. This free coasting is sometimes an undesirable feature, especially if the pallet or container rolls toward the aircraft doorway area and interferes with the loading or unloading process until moved. The free coasting is also undesirable since in certain circumstances, especially if there is an appreciable floor slope, a pallet can "get away" and roll the entire length of the aircraft until it is stopped abruptly by the end of the cargo compartment. Since such a pallet can gain considerable momentum on its trip through the aircraft, it can do expensive structural damage to the aircraft.

It has been prior practice to employ a series of electrically or manually operated retractable stop devices to keep the pallets or containers from undesirably moving. Such stops have proved to be undesirable because they apply abrupt deceleration force which damages the pallets, containers or cargo. In addition, the stops cause undesirable noise which has an unsettling effect on passengers within the aircraft. Also, due to the nature of the stops, they must be placed in very specific locations along the floor or the aircraft in relation to the size of the pallets or containers and therefore, the dimensions of the pallets or containers must be closely held to predetermined standards.

SUMMARY OF THE INVENTION

The present roller brake system includes a plurality of roller brake assemblies and means to enable controlled application of pressurized medium to the roller brake assemblies as desired. The roller brake assemblies includes a conveyor roller mounted for easy rotation and limited vertical translation and a brake pad positioned between structure and the roller. Pressurized medium is applied against the brake pads on the sides thereof opposite from the roller to force the pads into contact with the rollers causing the rollers to bear against and apply a restraining force to the bottom of the cargo pallet or container thereover. The braking force is generally proportional to the lifting force applied to the brake pad which, of course, is proportional to the pressure of the medium times the fixed area of the brake pad side against which the pressurized medium is applied. The limited translation of the rollers is accomplished by mounting the roller supporting shafts in slots so they are free to move within predetermined limits normal to the pallet or container being conveyed. This limited movement is required to compensate for the deflections and irregularities in the bottom surface of the pallets or containers since contact must be maintained between the roller and the pallets or containers if any braking effort is to be applied. The portion of the brake pad that contacts the conveyor roller is constructed of material such as ethylene propylene, having good wearing characteristics and a suitable coefficient of friction with the surface of the conveyor roller. The pad material must also be flexible enough to permit easy deflection by means of relatively low pressure medium.

The pressurized medium is distributed from a source through lines connected to the roller brake assemblies. The medium can be controlled by any suitable means such as an electrically actuatable solenoid control valve and pressure regulator located in the lines between the brake pad assemblies and the source of pressurized medium. The electrically actuated solenoid control valve is usually arranged so that when it is de-energized, it vents the lines to the brake assemblies, thereby deflating the brake pads, to allow the movement of pallets or containers along the roller conveyor system. Conversely, when the valve is energized, the brake pads are inflated to restrict movement. Therefore, if electrical power is lost, the aircraft can be unloaded manually.

It is also possible to incorporate a valve in each roller brake assembly so that only those assemblies in contact with a pallet or container are inflated. Although this introduces additional complications into the system, it minimizes the volume of pressurized medium required to operate the system.

One or more systems are usually installed in the aircraft to function in conjunction with a powered loading system or to function independently during manual loading operations. The present system will restrain any combination of pallets and/or containers from rolling or coasting due to reasonable slope of an aircraft floor. The magnitude of th braking force can be varied by the number of braking assemblies installed in the floor and by varying the pressure of the medium used to operate the system. Also, since the braking elements of the present system do not come in direct contract with the pellets or containers but instead transmit the retardation or holding forces into the conveyor rollers which are in direct contact with the conveyor load, the need for controlling and maintaining the surface conditions of the pallet or container bases is eliminated. This means that pallets and containers need not be replaced nearly as often as has been previously required when direct load bearing friction pads have been used.

Although the present system primarily is for use in aircraft, the system can be applied to any roller/conveyor system which requires speed control, snubbing or holding of conveyorized load units. Gravity flow control systems with multiple stopping and holding areas along the conveyor system can also provide ideal applications for the present system.

It is therefore an object of the present invention to provide a conveyor braking system with braking devices which can be randomly spaced and still accommodate any size and weight of conveyorized load units.

Another object of the present invention is to provide braking assemblies which are capable of transferring braking force to a conveyorized load unit by means of the conveyor roller supporting that particular load unit.

Another object of the present invention is to provide a roller brake system which can be mounted to follow and transmit the braking forces to load units having irregularities in the roller contacting surfaces thereof.

Another object is to provide a braking system where the braking force can be controlled easily by varying the pressure of the medium applied to the braking elements thereof.

Another object of the present invention is to provide roller brake assemblies controlled by pneumatic air pressure since pneumatic air pressure is easy to control, light in weight for onboard aircraft systems, and is readily available in cargo-type aircraft.

Another object is to provide roller brake means which can be easily modified to conform to any size and/or shape of roller conveyor.

Another object is to provide a roller braking system which can be easily installed and maintained to function with existing conveyor systems while adding little additional weight and expense.

These and other objects and advantages of the present invention will become apparent to those skilled in the art after considering the following detailed specification which covers particular embodiments thereof in conjunction with the accompanying drawings wherein:

DESCRIPTION OF THE PRESENT EMBODIMENTS

Figure 1:
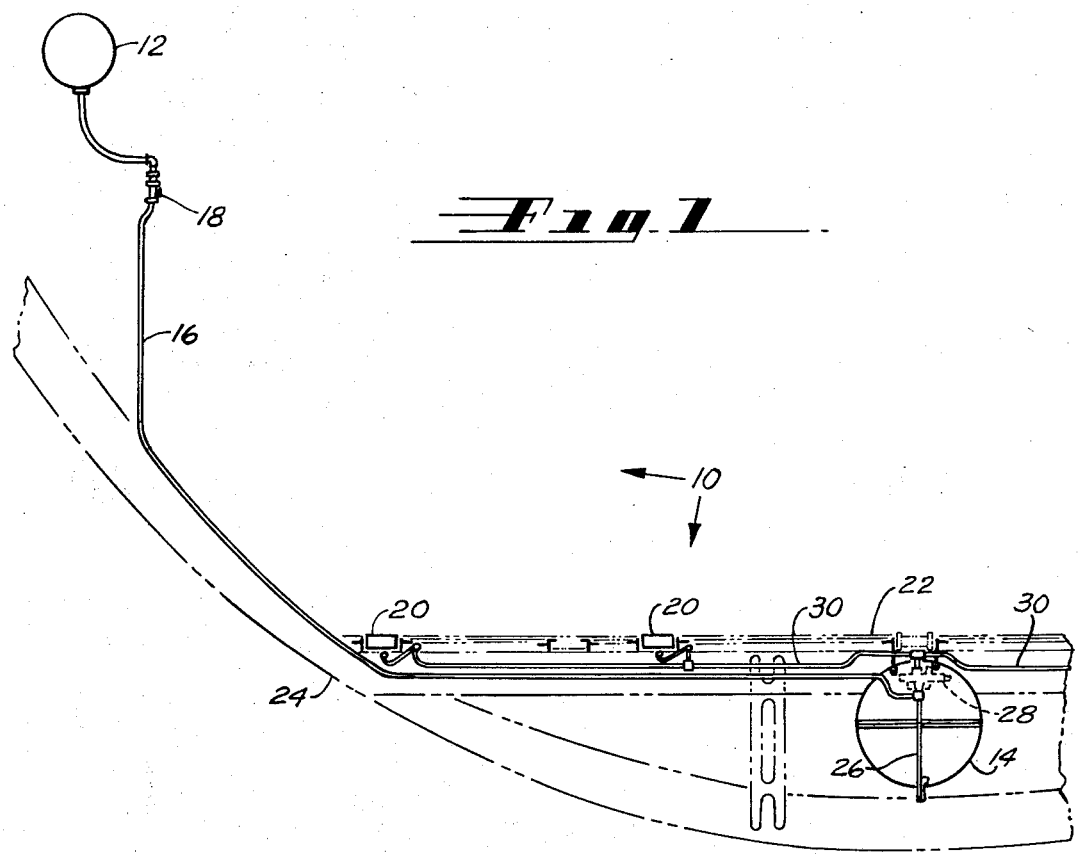
FIG. 1 is a partial cross-sectional view of an aircraft fuselage showing a portion of the present system installed therein.

Referring to the drawings more particularly by reference numbers, number 10 in FIG. 1 denotes a pneumatic roller brake system constructed according to the present invention. The system 10 includes a source of pressurized air 12 which is connected to a reservoir tank 14 by means of an interconnecting line 16 having a manual or automatic operating check valve 18 therein. The check valve 18 is provided to prevent the loss of air pressure in the tank 14 should the source 12 fail. The pressurized air in the tank 14 is predeterminately conducted to roller brake assemblies 20 which are shown positioned in the floor 22 of an aircraft 24. The pressurized air from the tank 14 is fed to the roller brake assemblies 20 through a line 26, a valve assembly 28 which includes a pressure regulator and a solenoid operated control valve such as are available from Circle Seal Corporation, Anaheim, Calif., and a supply line 30. It is preferable that the valve 28 be of the type that can be remotely controlled to provide air pressure to the roller brake assemblies 20 at any pressure from atmospheric pressure to a predetermined maximum pressure. It is also desirable that the valve 28 vents the line 30 to the assemblies 20 when de-energized so that the aircraft can be manually loaded and unloaded when no electrical power is available.

Figure 2:
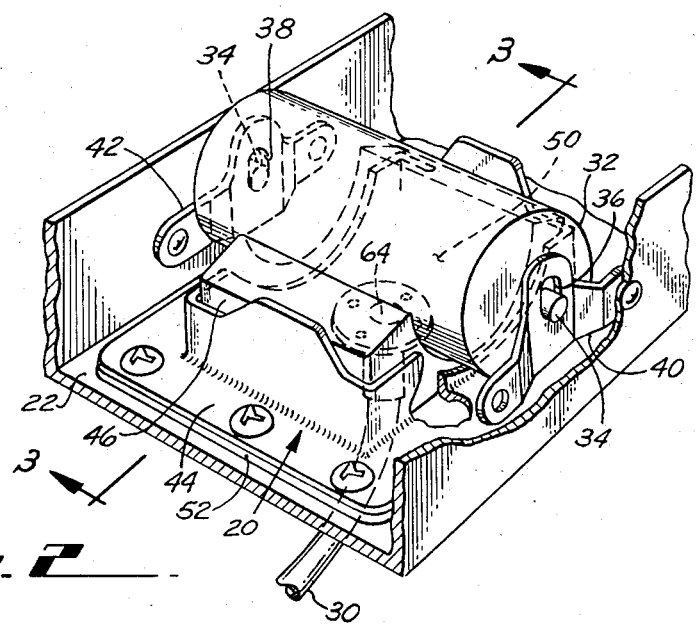
FIG. 2 is a perspective view of a roller brake assembly of the present invention.
Figure 3:
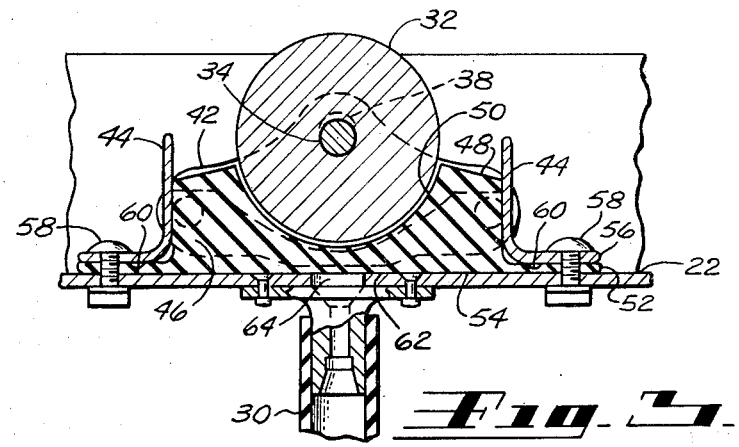
FIG. 3 is a cross-sectional view of the assembly of FIG. 2 taken on line 3—3 thereof.
Figure 4:
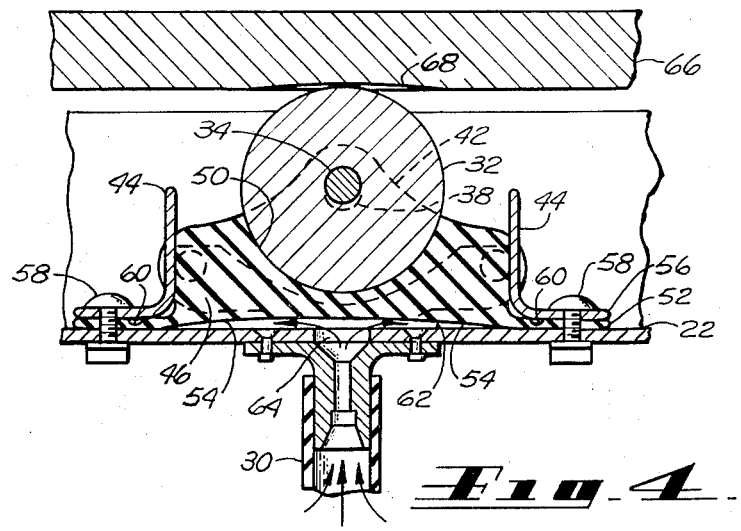
FIG. 4 is a cross-sectional view similar to FIG. 3 with the roller brake assembly in an energized condition.

As is shown in FIG. 2, the roller brake assembly 20 includes a roller 32 for conveying cargo over the floor 22 of the aircraft 24. The roller 32 is mounted for rotation and slight elevational movement with respect to the gravity by means of a shaft 34 which is retained in slots 36 and 38 formed in retention members 40 and 42 respectively. The retention members 40 and 42 are connected to structure. A brake retaining member 44 is also connected to aircraft structure to retain a brake pad 46 adjacent the roller 32. The brake pad member 46 includes a brake pad portion 48 which has a brake pad surface 50 shaped to closely approximate an arc of the load carrying surface of the roller 32. With reference to FIGS. 3 and 4, it can be seen that the brake member 46 also includes a flange portion 52 which extends radially outward from the sides of the brake member 54 thereof. The brake retaining member 44 also includes a radially outward extending flange portion 56. The flange 56 is connected to the floor structure 22 by suitable means such as the bolts 58 shown with the brake member flange 52 therebetween. The bolts 58 hold the retaining member 44 to the floor structure 22 to compress the flange 52 and form a seal about the periphery of the brake pad member 46. A bead 60 which extends from the flange 56 toward the floor structure 22, is included about the periphery of the retaining member 44 to assure the seal about the periphery of the brake member 46. This forms a sealed chamber 62 between the floor structure 22 and the brake pad member 46 inside the bead 60. A hole 64 in the floor structure 22, adjacent the chamber 62, allows communication of the supply lines 30 to the chamber 62. As shown in FIG. 4, when the pressurized air is conducted into the chamber 62, it causes the lower surface 54 of the brake pad member 46 to rise, forcing the braking surface 50 into the roller 32. The braking effort generated by the contract of the surface 50 with the roller 32 is generally proportional to the pressure of the air in the chamber 62 so that by controlling the pressure, the desired braking effort can be applied.

It is obvious that when choosing the material from which to construct the brake pad member 46, various factors must be considered such as good wearing characteristics and a suitable coefficient of friction with respect to the conveyor roller 32. In addition, the material must be flexible to permit easy deflection into contact with the roller 32. Many materials are suitable for such a brake pad member 46 including ethylene propylene.

As shown in FIG. 4, the braking effort generated by the assembly 20 is applied to the conveyed unit 66 in contact with the roller 32. Normally a plurality of roller brake assemblies 20 will simultaneously apply braking effort to a conveyed unit 66. If the unit 66 has imperfections 68 as shown, a fixed roller would lose contact with the unit 66 and the total braking effort on the unit would be reduced. However, in the present case the slots 36 and 38 enable a slight upward movement of the roller 32 when braking effort is being applied thereby allowing the roller 32 to be forced upward into the imperfection 68 to retain braking contact therewith.

When it is no longer desired to apply a braking effort to the conveyed unit, the pressure in the chamber 62 is reduced to atmospheric pressure allowing the brake pad member 46 to return to the position shown in FIG. 3.

Figure 5:
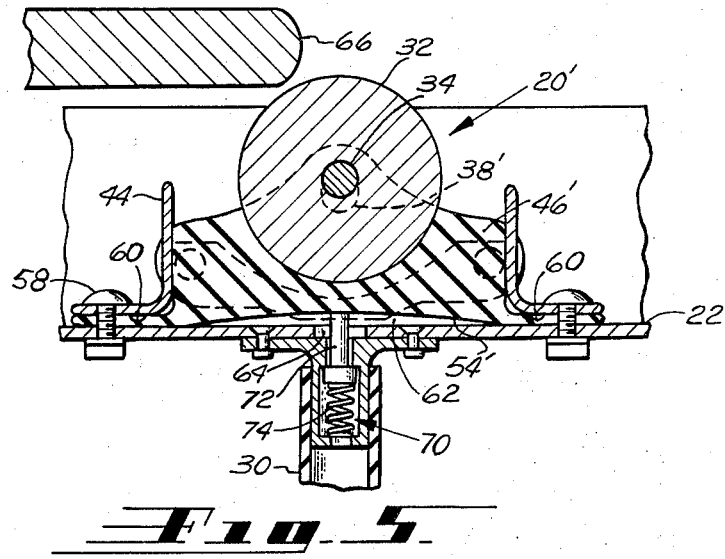
FIG. 5 is a cross-sectional view similar to FIGS. 3 and 4 of a slightly modified roller brake assembly.

FIG. 5 discloses a modified form of roller brake assembly 20' wherein modified portions are designated with the numbers of FIGS. 1 through 4 with a prime (') added thereto. The assembly 20' of FIG. 5 differs from the assembly 20 by having slots 36' and 38' (only slot 38' is shown) of enlarged vertical dimensions, a brake member 46' with a concave lower surface 54' and a plunger actuated valve assembly 70 located in the hole 64. The assembly 20' is for use when a limited supply of pressurized medium is available. The assembly 20' only uses the pressurized medium when a conveyed unit 66 is over the roller 32. The brake pad member 46' biases the roller 32 and its supporting shaft 34 from the floor structure 22 until the shaft 34 engages the upper portions of the slots 36' and 38'. When a cargo unit 66 contacts the roller 32, the roller 32 is forced down, forcing the braking member 46' down until the lower surface 54' thereof engages an upstanding nipple 72 of the valve assembly 70. As the nipple 72 is likewise forced down, it opens the valve 70 allowing air pressure into the chamber 62 to thereby apply braking effort to the roller 32 and the cargo unit 66.

When it is desired to eliminate the braking effort, the pressure in line 30 is reduced to atmospheric and the weight of the cargo unit 66 is partially transferred by the assembly 20' to the nipple 72 to overcome the biasing action of its valve spring 74 to thereby assure that the valve 70 remains open to allow te pressure in the chamber 66 to return to atmospheric pressure. The rate of the spring 74 can be chosen so a pressure differential across the valve assembly 70, with the high pressure in the chamber 62, also opens the valve assembly 70 to relieve the chamber pressure.

Thus there has been shown and described novel roller brake systems which fulfill all of the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A roller brake system including at least one roller brake assembly mounted to structure, said roller brake assembly being comprised of:
   a roller;
   a roller shaft connected to said roller;
   means for retaining said roller shaft at a predetermined orientation and distance from structure including means allowing limited movement of said roller shaft in a direction generally perpendicular to said shaft;
   a brake pad member between said roller and structure, said member having a surface for frictionally engaging said roller on a first side thereof, said member being sealably attached to structure on a second side opposite said first side thereof to define a chamber therebetween, said member biasing said roller away from said chamber;
   a source of pressurized medium;
   means to communicate the pressurized medium into said chamber whereby the flow of pressurized medium into said chamber deforms said brake pad member into frictional engagement with said roller, said communication means including valve means for controlling flow of medium into said chamber, said valve means having a portion positioned to contact said second side to allow flow through said valve means into said chamber when a load on said roller is overcoming said brake pad member bias and release valve means to allow flow of pressurized medium from said chamber when the pressure of said medium is higher on the chamber side thereof than on the opposite side thereof;
   means for controllably communicating said source of pressurized medium to said valve means including an electrically actuated pressure regulator valve, said regulator valve communicating medium to said valve means at a predetermined pressure when activated, a tank for storing pressurized medium, and a check valve for preventing flow of pressurized medium from said tank toward said source.

2. A roller brake system including at least one roller brake assembly mounted to structure, said roller brake assembly being comprised of:
   a roller;
   a roller shaft for supporting said roller;
   means for retaining said roller shaft at a predetermined orientation and distance from structure including means allowing limited movement of said roller shaft in a direction generally perpendicular to said shaft;
   a brake pad member between said roller and structure, said member having a surface for frictionally engaging said roller on a first side thereof, said member being sealably attached to structure on a second side opposite said first side thereof to define a chamber therebetween; and
   means to communicate pressurized medium into said chamber whereby the flow of pressurized medium into said chamber deforms said brake pad member into frictional engagement with said roller, said brake pad member biasing said roller away from said chamber, said communication means including valve means for controlling flow of medium into said chamber, said valve means having a portion positioned to contact said second side to allow flow through said valve means into said chamber when a load on said roller is overcoming said brake pad member bias.

3. The system defined in claim 2 wherein said valve means include:
   relief valve means to allow flow of pressurized medium from said chamber when the pressure of said medium is higher on the chamber side thereof than on the opposite side thereof.

* * * * *